US008585296B2

(12) United States Patent
Yamaguchi et al.

(10) Patent No.: US 8,585,296 B2
(45) Date of Patent: Nov. 19, 2013

(54) ROLLING BEARING SEALING DEVICE

(75) Inventors: Kunihiro Yamaguchi, Nagoya (JP); Youichi Numada, Toyota (JP); Ikuo Ito, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 346 days.

(21) Appl. No.: 12/736,954

(22) PCT Filed: May 26, 2009

(86) PCT No.: PCT/JP2009/059589
§ 371 (c)(1),
(2), (4) Date: Nov. 24, 2010

(87) PCT Pub. No.: WO2009/145178
PCT Pub. Date: Dec. 3, 2009

(65) Prior Publication Data
US 2011/0075958 A1    Mar. 31, 2011

(30) Foreign Application Priority Data

May 27, 2008 (JP) ............................... P2008-137936
Jul. 22, 2008 (JP) ............................... P2008-188473
Jul. 22, 2008 (JP) ............................... P2008-188474
Jul. 22, 2008 (JP) ............................... P2008-188475

(51) Int. Cl.
*F16C 33/76* (2006.01)
*F01D 11/02* (2006.01)

(52) U.S. Cl.
USPC ............ 384/484; 384/477; 277/347; 277/353

(58) Field of Classification Search
USPC .......... 384/477–478, 484–486; 277/351, 349, 277/353, 402, 549, 571, 572, 347
See application file for complete search history.

(56) References Cited

U.S. PATENT DOCUMENTS 2,478,140 A * 8/1949 Ulseth ........................... 277/571
2,856,208 A * 10/1958 Cobb ............................ 277/402
(Continued)

FOREIGN PATENT DOCUMENTS

CN        200999862 Y     1/2008
CN     200999862 (Y)     1/2008
(Continued)

OTHER PUBLICATIONS

Japanese Office Action dated Dec. 20, 2012, in JP 2008-188475 with English translation.

(Continued)

*Primary Examiner* — Marcus Charles
(74) *Attorney, Agent, or Firm* — McGinn IP Law Group, PLLC

(57) ABSTRACT

An axial lip is formed on a side surface of a seal of a rolling bearing which faces a slinger so as to expand outwards of the bearing. A projecting portion is formed on a flat surface of the slinger which faces the seal by flexing the slinger in an axial direction so as to cause the slinger to project inwards of the bearing, and a distal end of the axial lip is brought into contact with the flat surface of the slinger in a position lying further radially outwards than the projecting portion on the slinger. A radially inward inner surface of the axial lip of the axial lip and a radially outer side sloping surface formed radially outwards of the projecting portion on the slinger form a labyrinth, and a portion of the side surface of the seal which lies further radially inwards than the position where the axial lip is formed and an apex portion of the projecting portion on the slinger form a labyrinth.

6 Claims, 7 Drawing Sheets

(56) References Cited

U.S. PATENT DOCUMENTS

| | | | |
|---|---|---|---|
| 4,792,243 A | 12/1988 | Takeuchi et al. | |
| 4,906,009 A * | 3/1990 | Saitoh | 277/402 |
| 5,431,413 A | 7/1995 | Hajzler | |
| 5,649,710 A * | 7/1997 | Kanda | 277/571 |
| 5,908,249 A * | 6/1999 | Nisley et al. | 384/484 |
| 5,975,534 A * | 11/1999 | Tajima et al. | 277/353 |
| 6,921,083 B2 * | 7/2005 | Yasui et al. | 277/572 |
| 6,979,001 B2 * | 12/2005 | Ohtsuki et al. | 384/478 |
| 7,021,830 B2 * | 4/2006 | Takehara et al. | 384/486 |
| 7,464,939 B2 * | 12/2008 | Matsui | 277/572 |
| 2006/0045400 A1 * | 3/2006 | Yamamoto | 384/448 |
| 2007/0187901 A1 * | 8/2007 | Matsui | 277/551 |
| 2008/0029967 A1 * | 2/2008 | Nakagawa et al. | 277/349 |

FOREIGN PATENT DOCUMENTS

| | | |
|---|---|---|
| DE | 36 16 999 A1 | 11/1987 |
| JP | 62-278315 A | 12/1987 |
| JP | 2-25774 U | 2/1990 |
| JP | 3-20175 A | 1/1991 |
| JP | 03020175 A * | 1/1991 |
| JP | 6-3227 Y2 | 1/1994 |
| JP | 6-3227 (Y2) | 1/1994 |
| JP | 6-281018 A | 10/1994 |
| JP | 11-230179 A | 8/1999 |
| JP | 2000-18260 A | 1/2000 |
| JP | 2001-50288 A | 2/2001 |
| JP | 2003-294048 A | 10/2003 |
| JP | 2003287142 A * | 10/2003 |
| JP | 2003294048 A * | 10/2003 |
| JP | 2004-11732 A | 1/2004 |
| JP | 2006-144812 A | 6/2006 |
| JP | 2006-258131 A | 9/2006 |
| JP | 2006-266451 A | 10/2006 |
| JP | 2007-177815 A | 7/2007 |
| JP | 2007187265 A * | 7/2007 |
| JP | 2008144828 A * | 6/2008 |

OTHER PUBLICATIONS

Japanese Office Action dated Dec. 20, 2012, in JP 2008-188474 with English translation.
Extended European Search Report in EP 0975468.5 dated Feb. 8, 2013.
Japanese Office Action dated Jan. 31, 2013, with English translation.
Japanese Office Action dated Mar. 27, 2013, with English translation.
Japanese Office Action dated Oct. 29, 2012, with English translation.
Chinese Office Action dated Oct. 10, 2012, with English translation.

* cited by examiner

ROLLING BEARING SEALING DEVICE

CROSS REFERENCE TO RELATED APPLICATIONS

The present application claims priority from Japanese Application No. 2008-137936, Japanese Application No. 2008-188473. Japanese Application No. 2008-188474, and Japanese Application No. 2008-188475, the disclosures of which are incorporated herein by reference in their entirety.

TECHNICAL FIELD

The present invention relates to a rolling bearing sealing device. More particularly, the invention relates to a rolling bearing sealing device in which a space between an inner ring and an outer ring is covered with a seal and a slinger is provided on an outer side of the seal.

BACKGROUND ART

A bearing for use in an idler bearing which is used in auxiliary peripheral equipment of an automotive engine such as an idler pulley, for example, includes a sealing device which covers a space between an outer ring and an inner ring with an annular seal so as to suppress the intrusion of foreign matters such as water and dust into an interior of the bearing. In addition, since the bearing of this type needs to permit a relative rotation between the inner ring and the outer ring, an outer circumference of the seal is fixed to the outer ring, and a seal lip is provided on an inner circumference of the seal so as to be brought into sliding contact with the inner ring.

Since the idler bearing is used to rotate at high speeds, the seal lip needs to be a light contact type having a small amount of interference in order to prevent a sliding portion of the seal from being heated. Because of this, it cannot be said that a sufficient sealing property against water and dust which attempt to intrude from the outside is obtained only by covering the space between the outer ring and the inner ring with the seal, and it is difficult to suppress the entrance of water and dust into the interior of the bearing from the space between the seal lip and the inner ring.

Then, in order to increase the water resistance of the bearing, normally, a shield plate called a slinger is provided on an outer side of the seal so that the seal lip is prevented from being subjected to water and dust.

In order to increase the water resistance further, an axial lip is formed to extend axially outwards from the seal so that the axial lip can be brought into contact with the slinger, whereby a space between the seal and the slinger is closed.

For example, JP-A-2004-11732 (Patent Document 1) describes a bearing sealing construction in which a seal has an axial lip.

FIG. 14 shows a sealing construction which is almost the same as the bearing sealing construction described in Patent Document 1 and which comprises a seal main body 110 and a slinger 105. Formed on the seal main body 110 are a seal lip 120 which is brought into sliding contact with a portion which lies parallel to an axis on an inner circumferential side of the slinger 105 and an axial lip 112 which is brought into sliding contact with a portion which lies vertical to the axis of the slinger 105. Since this axial lip 112 is brought into contact with the slinger 105 so as to close a path along which foreign matters such as water and dust reach the periphery of the seal lip 120, the waterproofness and dustproofness of the bearing are increased, and a increase in the sealing performance of the bearing can be expected.

RELATED ART

Patent Document

Patent Document 1: JP-A-2004-11732

SUMMARY OF THE INVENTION

Problem that the Invention is to Solve

However, in a configuration in which an axial lip is brought into contact with a slinger, interference needs to be increased so as to increase the sealing performance of a bearing, causing a problem that the rotating torque of the bearing is increased.

In addition, in a configuration in which a seal is fixed to an outer ring so as to rotate together with the outer ring and an axial lip expands radially outwards so as to be brought into contact with a slinger from an outside diameter side thereof, in the event that the axial lip is formed on the outside diameter side, a centrifugal force is increased which acts in a direction in which the axial lip is pulled apart from the slinger, causing a problem that a gap is generated between the axial lip and the slinger.

In the configuration in which the axial lip is brought into contact with the slinger, the interference of the axial lip relative to the slinger affects the water-resisting performance of the bearing largely. In addition, in a configuration in which labyrinth is formed by an axial lip and a slinger, too, the width of a space of the labyrinth affects the water-resisting performance of the bearing largely. Then, it has been important in designing a bearing sealing construction or device to ensure the accuracy of the slinger and the rigidity of the slinger which affects the accuracy of the slinger.

In the event that water intrudes radially into the interior of a bearing after having surpassed a contact portion or a space between an axial lip and a slinger, in a normal application, the water-resistance of the bearing can be ensured by a seal lip. However, in the event that the bearing is used in a special application, it has been necessary to study a further increase in water resistance.

In recent years, motor vehicles are used in severe conditions including a condition in which lots of water is poured thereon. Thus, motor vehicles are required to be used in such conditions that a water resistance is required which surpasses a water resistance obtained by an axial lip. Then, in order to maintain the required water resistance even in the event that lots of water is poured on the motor vehicle, it is necessary that the contacting state between the axial lip and the slinger is stabilized or the width of the space of the labyrinth is stabilized by increasing the rigidity of the slinger so as to suppress the deflection or warpage of the slinger. In addition, it is necessary to increase further the water resistance at a portion lying further radially inwards than the axial lip to deal with a probable risk of water radially intruding into the interior of the bearing from the contacting portion between the axial lip and the slinger or the labyrinth defined by the axial lip and the slinger.

Then, a problem that the invention is to solve is to provide a rolling bearing sealing device which reduces the wear of a seal by reducing the sliding torque of an axial lip and realizes an enhancement in water resistance.

Means For Solving the Problem

With a view to solving the problem, a rolling bearing sealing device according to the invention adopts the following measures.

Firstly, according to a first invention of the invention, there is provided a rolling bearing sealing device comprising a seal fixed to an outer ring and a slinger disposed concentrically with an inner ring on a side of the seal which faces an outside of the bearing or an axially outer side of the seal, a space defined by the seal and the slinger being open to an exterior portion of the bearing, the rolling bearing sealing device characterized in that an axial lip which expands radially outwards of the bearing is formed on a side surface of the seal which faces the slinger, a surface of the slinger which faces the seal is made into a flat surface and a projecting portion is formed on the flat surface of the slinger which is caused to project inwards of the bearing relative to the flat surface by flexing the slinger in an axial direction, a distal end of the axial lip is put in a contacting state with or a non-contact, closely lying state to the flat surface of the slinger at a portion lying further radially outwards than the projecting portion on the slinger, a radially inwards inner surface of the axial lip and a radially outer side sloping surface which is formed radially outwards of the projecting portion on the slinger are put in a non-contact, closely lying state to each other so as to form a labyrinth, and a portion of the side surface of the seal which lies further radially inwards than the position where the axial lip is formed and an apex portion of the projecting portion on the slinger are put in a non-contact, closely lying state to each other so as to form a labyrinth.

According to the first invention, the rigidity of the slinger is increased by providing the projecting portion on the flat surface of the slinger so as to flex the slinger. Consequently, since the deflection of warpage of the slinger is suppressed, in the configuration in which the axial lip is brought into contact with the slinger, the axial lip is prevented from being spaced apart from the slinger. In addition, a stable contacting state between the axial lip and the slinger can be maintained. In the configuration in which the axial lip is put in the non-contact, closely lying state to the slinger, a change in the width of a space of the labyrinth formed by the axial lip and the slinger is suppressed. Consequently, a radially inward intrusion of water into the bearing by overpassing the axial lip can be suppressed.

The radially inwards inner surface of the axial lip and the radially outer side sloping surface of the projecting portion on the slinger form the labyrinth at the portion lying further radially inwards than the position where the axial lip is brought into contact with the slinger, and further, the portion of the side surface of the seal which lies further radially inwards than the position where the axial lip is formed and the apex portion of the projecting portion on the slinger form a labyrinth. Consequently, even in the event that water overpasses the axial lip to intrude radially inwards into the bearing, water can be prevented from intruding to the proximity of the inner ring of the bearing by the labyrinth formed on a radially inner side of the axial lip, thereby making is possible to increase the water resistance of the bearing.

Next, according to a second invention of the invention, there is provided a rolling bearing sealing device as set forth in the first invention, characterized in that a projecting portion projecting outwards of the bearing is formed on the side surface of the seal at a portion which lies further radially outwards than the distal end of the axial lip and the projecting portion and the slinger are put in a non-contact, closely lying state to each other so as to form a labyrinth.

According to the second invention, the projecting portion formed on the side surface of the seal at the portion which lies further radially outwards than the distal end of the axial lip and the slinger are put in a non-contact, closely lying state to each other so as to form the labyrinth. Consequently, it is possible to suppress an intrusion of foreign matters such as water and dust into the space defined between the portion of the seal which lies on a radially outer side of the axial lip and the slinger from a radially outer side end of the slinger.

According to a third invention of the invention, there is provided a rolling bearing sealing device comprising a seal fixed to an outer ring so as to rotate together with the outer ring and a slinger disposed on an outer side of the seal and open to an outside of the bearing on a radially outer side of the slinger, the rolling bearing sealing device characterized in that the seal is constructed so that a side of a core metal which faces an outside of the bearing or an axially outer side of the core metal is covered with an elastic member, a seal lip is formed on a side of an inner circumferential edge portion of the seal which faces an inside of the bearing or an axially inner side of the inner circumferential edge portion so as to be brought into contact with an inner ring, a conical side lip is formed of an elastic member on a side of the seal which faces an outside of the bearing or an axially outer side of the seal which faces the slinger at a portion which lies further radially outwards than the seal lip so as to be inclined from a radially outward portion to the outside of the bearing to be expanded outwards of the bearing, and a gutter-shaped groove is formed in a radially outer side of a root portion of the side lip, and a distal end of the side lip is kept non-contact with the slinger in such a state that the bearing is rotating.

According to the third invention, the side lip is formed on the side surface of the seal which faces the slinger. In addition, since the distal end of the seal is kept non-contact with the slinger in such a state that the bearing is rotating, a labyrinth is formed by the distal end of the seal and the slinger so that foreign matters such as water and dust which enter between the seal and the slinger from a radially outer side of the slinger is prevented from intruding into a radially inner side of the bearing. Note that when used in the invention, the word "non-contact" is used to express an idea which includes an event that the distal end of the seal is in contact with the slinger with no contacting force. Since the space defined between the seal and the slinger is closed by the side slip when the distal end of the seal is in contact with the slinger with no contacting force, foreign matters such as water and dust which enter between the seal and the slinger from the radially outer side of the slinger is prevented from intruding into the radially inner side of the bearing. Since there is no fear that the core metal of the seal is deformed due to the side lip being kept non-contact with the slinger, there is no concern that the sliding contact of the seal lip with the inner ring is changed due to the deformation of the core metal.

Consequently, the deformation of the core metal of the seal can be avoided, whereby an intrusion of foreign matters such as water and dust which enter between the seal and the slinger into the interior of the bearing can be suppressed, thereby making it possible to increase the sealing performance of the bearing.

Next, according to a fourth invention of the invention, there is provided a rolling bearing sealing device as set forth in the third invention, characterized in that a distal end face of which a front surface is vertical to an axial direction is formed at the distal end of the side lip, a flat portion which is vertical to the axial direction is formed on a side surface of the slinger which faces the distal end face, and a space between the distal end face and the flat portion is made narrow in such a state that the bearing is rotating so that a labyrinth is formed by the distal end face and the flat portion, and when the bearing is stationary, the distal end of the side lip which is left in an upper position when the bearing has stopped rotating collapses by gravity to thereby be brought into contact with the flat portion of the slinger.

According to the fourth invention, the labyrinth is formed by the distal end face of the side lip of the seal and the slinger depending upon the rotating state of the bearing, an intrusion of foreign matters such as water and dust which enter between the seal and the slinger from a radially outer side of the slinger into a radially inner side of the bearing is suppressed. Since the distal end face of which the front surface is vertical to the axial direction is formed at the distal end of the slide lip, the radial width of the labyrinth gets wide and the sealing performance obtained by the labyrinth is increased when the bearing is stationary, since the distal end of the side lip which is left in the upper position when the bearing has stopped rotating collapses by gravity to thereby be brought into contact with the flat portion of the slinger, the space between the seal and the slinger is closed by the side lip in the upper position of the bearing. Consequently, when lots of water is poured on to the bearing while the bearing is stationary, as a result of which water enters between the seal and the slinger, water flows downwards of the bearing along a radially outer side of the side lip. Therefore, an intrusion of water into the radially inner side of the bearing from between the seal and the slinger is suppressed.

According to a fifth invention, there is provided a rolling bearing sealing device comprising a seal which is fixed to an outer ring so as to rotate together with the outer ring and which is brought into sliding contact with an inner ring and a slinger which is disposed concentrically with the inner ring on a side of the seal which faces an outside of the bearing or an axially outer side of the seal, a space portion defined by the seal and the slinger being open to an exterior portion of the bearing at a radially outer side end of the slinger, the rolling bearing sealing device characterized in that an axial lip is formed on a side surface of the seal which faces the slinger so as to extend outwards of the bearing, a first sliding contact portion which is conical and a second sliding contact portion which is reversely conical are formed on the axial lip, the first sliding contact portion expanding outwards of the bearing and being disposed so as to be brought into contact with the slinger at a distal end portion thereof in such a state that the bearing has stopped rotating and the second sliding contact portion contracting outwards of the bearing and being disposed so as to be kept non-contact with the slinger in such a state that the bearing has stopped rotating, and the second sliding contact portion of the axial lip is brought into contact with slinger by a centrifugal force in such a state that the bearing is rotating at high speeds.

According to the fifth invention, the first sliding contact portion of the axial lip is brought into contact with the slinger when the bearing has stopped rotating or is rotating at low speeds, whereby an intrusion of foreign matters such as water and dust into the interior of the bearing from between the seal and the slinger can be suppressed. In addition, when the bearing is rotating at high speeds, the second sliding contact portion of the axial lip is deformed radially outwards of the bearing by the centrifugal force, so as to be brought into contact with the slinger. Consequently, even when the bearing is rotating at high speeds, an intrusion of foreign matters such as water and dust into the interior of the bearing from between the seal and the slinger can be suppressed. Note that since the second sliding contact portion of the axial lip is kept non-contact with the slinger in such a state that the bearing has stopped rotating, there is generated no increase in torque due to the second sliding contact portion being provided on the axial lip.

Next, according to a sixth invention of the invention, there is provided a rolling bearing sealing device as set forth in the fifth invention, characterized in that the axial lip expands outwards of the bearing, a distal end of the axial lip is made into the first sliding contact portion, and the second sliding contact portion is formed by a portion of the axial lip which branches off at an intermediate portion of the axial lip which expands outwards of the bearing, a projecting portion is formed on a side surface of the slinger which faces the seal, and the second sliding contact portion of the axial lip is brought into contact with a radially inner side of the projecting portion on the slinger in such a state that the bearing is rotating at high speeds.

According to the sixth invention, when the axial lip is deformed so as to be pulled radially outwards by the centrifugal force, the second sliding contact portion which branches off at the intermediate portion of the axial lip is also deformed so as to be pulled radially outwards in association with the deformation of the axial lip. Because of this, even though an axial length of the axial lip from a root portion to a distal end of the second sliding contact portion changes little, the second sliding contact portion can be brought into contact with the radially inner side sloping surface of the projecting portion on the slinger. Consequently, the deformation which causes the first sliding contact portion to move away from the slinger by the centrifugal force exerted on the axial lip can be connected to the deformation which brings the second sliding contact portion into contact with the projecting portion on the slinger. In addition, since the second sliding contact portion of the axial lip does not have to reach the side surface of the slinger by changing its axial length by the deformation, the length of the second sliding contact portion can be set so short as to increase the rigidity thereof.

According to a seventh invention of the invention, there is provided a rolling bearing sealing device comprising a seal fixed to an outer ring and a slinger disposed concentrically with an inner ring on a side of the seal which faces an outside of the bearing or an axially outer side of the seal, a space formed by the seal and the slinger being open to an exterior portion of the bearing at a radially outer side end portion of the slinger, the rolling bearing sealing device characterized in that a seal lip configured so as to be brought into sliding contact with the inner ring is formed at an inner circumferential edge of the seal and a portion of the seal which lies further radially outwards than the position where the seal lip is formed is made into a flat side surface, a surface of the slinger which faces the seal is made into a flat surface, a flexed projecting portion is formed on the flat surface of the slinger by flexing part of the flat surface in an axial direction so as to project inwards of the bearing, and a side surface of the seal and the flexed projecting portion of the slinger are put in a non-contact, closely lying state to each other so as to form a labyrinth, and an axial lip is formed on the side surface of the seal so as to extend outwards of the bearing and a distal end of the axial lip is brought into contact with the flat surface of the slinger in a position lying further radially inwards than the position where the flexed projecting portion is formed on the slinger.

According to the seventh invention, since the flat surface of the slinger with which the distal end of the axial lip is brought into contact lies on a radially inner side of the bearing which lies further radially inwards of the bearing than the flexed projecting portion on the slinger, a diameter of the distal end of the axial lip which is brought into contact with the flat surface of the slinger is small, and a sliding surface area between the axial lip and the slinger becomes small. In addition, since a circumferential velocity based on a relative rotation between the axial lip and the slinger becomes small, torque is reduced, thereby making it possible to reduce the wear of the axial lip. Since heat produced by sliding contact between the axial lip and the slinger is reduced so as to mitigate the heat resistance of the seal, a material having heat resistance which is not high can be used for the seal.

Since the axial lip is brought into contact with the flat surface of the slinger so as to close the space between the seal and the slinger, foreign matters such as water and dust which intrude into the space between the seal and the slinger from an opening portion of the bearing at the radially outer side end portion of the slinger can be prevented from intruding into the periphery of the seal lip which lies further radially inwards of the bearing than the position where the axial lip is formed.

Foreign matters such as water and dust which intrude into the space between the seal and the slinger from an opening portion of the bearing at the radially outer side end portion of the slinger can be prevented from intruding into the portion which lies further radially inwards than the flexed projecting portion on the slinger and where the axial lip and the flat portion of the slinger are brought into contact with each other by the labyrinth formed by the side surface of the seal and the flexed projecting portion on the slinger. The rigidity of the slinger can be increased in such a state that the slinger is attached to the bearing by forming the flexed projecting portion on the slinger.

Next, according to an eighth invention of the invention, there is provided a rolling bearing sealing device 3 as set forth in the seventh invention, characterized in that a projecting portion is formed at a radially outward end of the side surface of the seal so as to project outwards of the bearing and the projecting portion is kept in a non-contact, closely lying state to the radially outer side end portion of the slinger so as to form a labyrinth therebetween.

According to the eighth invention, an intrusion of foreign matters such as water and dust into the space between the seal and the slinger from the radially outer side end portion of the slinger is suppressed by the labyrinth formed by the projecting portion which is formed at the radially outward end of the seal and the radially outer side end portion of the slinger.

Since the projecting portion of the seal can be used as a position where the seal is held when it is accommodated in the bearing, the axial lip can be prevented from being deformed by holding the axial lip when the seal is accommodated in the bearing.

Advantage of the Invention

The following advantages can be obtained according to the respective inventions of the invention that have been described above.

Firstly, according to the first invention, since the rigidity of the slinger is increased, in the state in which the axial lip is in contact with the slinger, the contacting state is maintained, whereas in the state in which the axial lip is not in contact with the slinger, the width of the space of the labyrinth is maintained almost constant, whereby the water resistance of the axial lip is increased. In addition, even in the event that water intrudes into the interior of the bearing by overpassing the axial lip, the intrusion of water into the proximity to the inner ring can be suppressed by the labyrinth formed on the radially inner side of the axial lip, thereby making it possible to increase the water resistance of the bearing.

Next, according to the second invention, the intrusion of foreign matters such as water and dust into the space defined between the portion of the seal which lies on the radially outer side of the axial lip and the slinger from the radially outer side end portion of the slinger is suppressed.

According to the third invention, in the state in which the bearing is rotating, compared with a case of there being neither slinger nor side lip, the side lip of the seal forms the extremely narrow labyrinth or is brought into contact with the slinger with no contacting force exerted so as to close the space with the slinger. Therefore, the intrusion of foreign matters such as water and dust which enter between the seal and the slinger into the radially inner side of the bearing is suppressed. In addition, there is no fear that the core metal of the seal is deformed since the side slip is not in contact with the slinger. Therefore, there is no concern that the state in which the seal lip is in sliding contact with the inner ring is changed due to the deformation of the core metal. Consequently, the deformation of the core metal of the seal can be avoided, whereby the intrusion of foreign matters such as water and dust which enter between the seal and the slinger into the interior of the bearing can be suppressed, thereby making it possible to increase the sealing performance of the bearing. In addition, there is almost no increase in torque due to the contact of the side lip with the slinger.

Next, according to the fourth invention, in the state in which the bearing is rotating, the distal end face of the side lip of the seal and the flat portion of the slinger forms the labyrinth which is wide in the radial direction, whereby the intrusion of foreign matters such as water and dust which enter between the seal and the slinger into the radially inner side of the bearing is suppressed. In addition, when the bearing is stationary, the distal end of the side slip which is left in the upper position when the bearing has stopped rotating collapses by gravity so as to close the space between the seal and the slinger. Consequently, when lots of water is poured on to the bearing while it is stationary whereby water enters between the seal and the slinger, since water flows downwards of the bearing along the radially outer side of the side lip, the intrusion of water into the radially inner side of the bearing from the space between the seal and the slinger is suppressed.

According to the fifth invention, when the bearing has stopped rotating or is rotating at low speeds, the first sliding contact portion of the axial lip is brought into contact with the slinger, whereas when the bearing is rotating at high speeds, the second sliding contact portion of the axial lip is brought into contact with the slinger. Consequently, whether the bearing is rotating at low speeds or at high speeds, the intrusion of water or foreign matters into the interior of the bearing from the space defined between the seal and the slinger can be suppressed.

Next, according to the sixth invention, the deformation which causes the first sliding contact portion to move away from the slinger by the centrifugal force exerted on the axial lip can be connected to the deformation which brings the second sliding contact portion into contact with the projecting portion on the slinger. In addition, since the second sliding contact portion of the axial lip does not have to reach the side surface of the slinger by changing its axial length by the deformation, the length of the second sliding contact portion can be set so short as to increase the rigidity thereof.

According to the seventh invention, the axial lip is formed on the radially inner side of the bearing, and the circumferential velocity based on the relative rotation between the axial lip and the slinger becomes small. Therefore, torque is reduced, whereby the wear of the axial lip can be reduced. In addition, heat generated by sliding is reduced and the heat resistance of the seal is mitigated. In addition, the intrusion of foreign matters such as water into the periphery of the axial lip is suppressed by the labyrinth formed by the portion of the side surface of the seal which is formed radially outwards of the axial lip and the flexed projecting portion of the slinger. Additionally, the rigidity of the slinger can be increased by the flexed projecting portion.

Next, according to the eighth invention, the intrusion of foreign matters such as water into the space defined between the seal and the slinger from the radially outer side end portion of the slinger by the labyrinth formed by the projecting portion formed at the radially outward end of the seal and the radially outer side end portion of the slinger. In addition, the projecting portion can be used as the position where the seal is to be held when it is accommodated in the bearing.

Consequently, the sliding torque of the axial lip can be reduced so as to reduce the wear of the seal, and an increase in water resistance can be realized.

MODE FOR CARRYING OUT THE INVENTION

Embodiment 1

Hereinafter, best modes for carrying out the invention will be described in accordance with embodiments.

Figure 1:
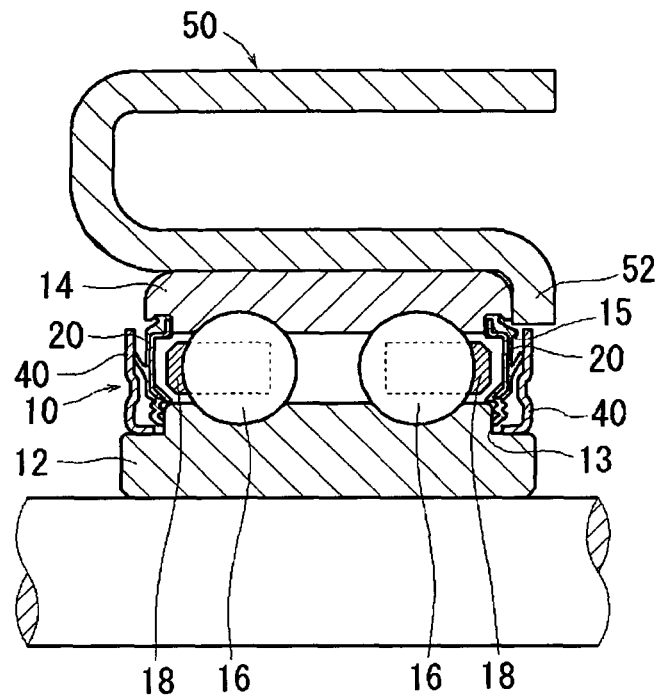
FIG. 1 A partial sectional view of an idler pulley used in a bearing including a rolling bearing sealing device according to Embodiment 1.
Figure 2:
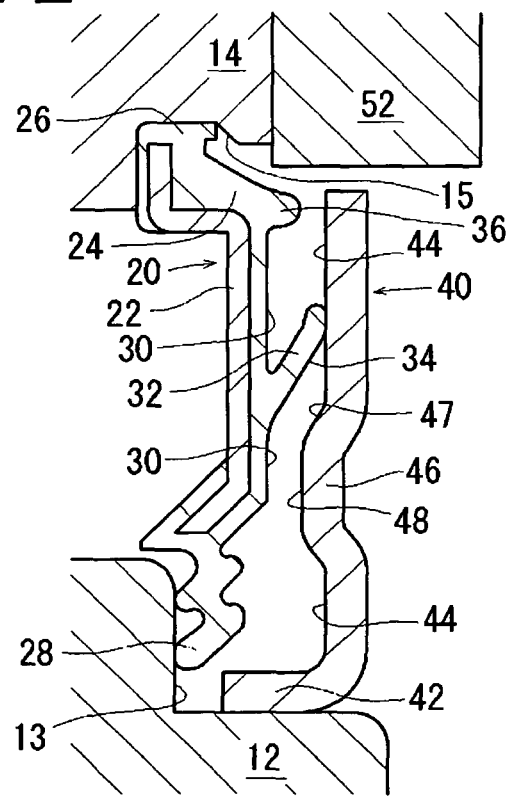
FIG. 2 An enlarged view of a portion related to the rolling bearing sealing device in FIG. 1.

FIG. 1 shows a partial sectional view of an idler pulley 50 used in a rolling bearing 10 including a rolling bearing sealing device according to Embodiment 1 of the invention. FIG. 2 shows an enlarged view of a sealing device portion of the rolling bearing 10 shown in FIG. 1.

As is shown in FIGS. 1 and 2, an outer ring rotating type double row ball bearing used for the idler pulley 50 which includes an inner ring 12, an outer ring 14, a cage 18 for retaining double rows of balls 16, 16, a seal 20 for covering a space defined between the inner ring 12 and the outer ring 14, and a slinger 40 provided on a side of the seal 20 which faces an outside of the bearing or an axially outer side of the seal 20. In these constituent elements, the inner ring 12, the outer ring 14, the seal 20 and the slinger 40 constitute a sealing device of the rolling bearing 10.

The seal 20 is an annular member in which a side of a metallic core metal 22 which faces the outside of the bearing or an axially outer side of the metallic core metal 22 is covered with a rubber covering portion 24, and fixing portion 26 is formed at an outer circumferential edge portion of the seal 20 for mounting the seal 20 on the outer ring 14. The seal 20 is fixed to a bore surface or a radially inner surface of the outer ring 14 by the fixing portion 26 being installed in a seal groove 15 provided in the radially inner surface of the outer ring 14. A seal lip 28 is formed on a side of an inner circumferential edge portion of the seal 20 which faces the outside of the bearing or an axially outer side of the inner circumferential edge portion of the seal 20. The seal lip 28 is brought into sliding contact with a sliding contact surface 13 which is formed vertical to an axial direction on a radially outer side of the inner ring 12. When the seal 20 rotates together with the outer ring 14 at high speeds, the seal lip 28 rotates at high speeds while being in sliding contact with the sliding contact surface 13. Due to this, in order to reduce the wear of the seal lip 28, the seal lip 28 is adapted to contact the sliding contact surface 12 lightly.

As is shown in FIG. 2, a portion on the axially outer side of the seal 20 which lies between the fixing portion 26 and the seal lip 28 is formed into a flat side surface 30, and a conical axial lip 32 is formed on the side surface 30 at a portion which lies slightly further radially inwards than a radially central portion so as to extend while expanding outwards of the bearing. A projecting portion 36 is formed at a radially outer side end of the side surface 30 of the seal 20 in a position which lies further radially outwards than a distal end of the axial lip 32 so as to extend outwards of the bearing.

The slinger 40 is an annular metallic plate. As is shown in FIG. 2, a cylindrical portion 42 of which an inner circumferential edge is bent inwards of the rolling bearing 10 into a cylindrical shape is formed on a radially inner side of the slinger 40, and the slinger 40 is fixed to the inner ring 12 by the cylindrical portion 42 being press fitted on a radially outer side of the inner ring 12. A configuration may be adopted in which the slinger 40 is fixed directly to a shaft.

A portion of the slinger 40 where the slinger 40 faces the side surface 30 of the seal 20 is formed into a flat surface 44 which is almost parallel to the side surface 30 of the seal 20, and a radially outer side end of the slinger 40 has a space defined by the seal 20, the radially inner surface of the outer ring 14 and a rib 52 of the idler pulley 50. The space is open to an exterior portion of the bearing.

The slinger 40 is flexed in the axial direction along the full circumference thereof at a portion lying slightly further radially inwards than a radially central portion of the flat surface 44 of the slinger 40 so as to form an annular projecting portion 46 which is caused to project axially inwards relative to the flat surface 44. An apex portion 48 of which a surface is vertical to the axial direction is formed at a radial center of the projecting portion 46, and a radially outer side sloping surface 47 of which an inclination relative to an axial direction of the surface is constant is formed radially outwards of the apex portion 48.

As is shown in FIG. 2, the distal end of the axial lip 32 is brought into contact with the flat surface 44 of the slinger 40 in a position lying further radially outwards than the projecting portion 46 on the slinger 40.

A radially inner side inner surface 34 of the axial lip 32 and the radially outer side sloping surface 47 of the projecting portion 46 of the slinger 40 are put in an almost parallel, non-contact, closely lying state to each other so as to form a labyrinth. In addition, a portion on the side surface 30 of the seal 20 which lies further radially inwards than the position where the axial lip 32 is formed and the apex portion 48 of the projecting portion 46 on the slinger 40 are put in an almost parallel, non-contact, closely lying state to each other so as to form a labyrinth.

The projecting portion 36 on the side surface 30 of the seal 20 is put in a non-contact, closely lying state to the flat surface 44 of the slinger 40 at a portion lying further radially outwards than the position where the distal end of the axial lip 32 is brought into contact with the flat surface 44 of the slinger 40 so as to form a labyrinth.

In addition, a configuration can be adopted in which the projecting portion 36 on the side surface 30 of the seal 20 is caused to project into a non-contact, closely lying state to the slinger 40 in a radially outward position of a radially outer side distal end of the slinger 40 so that the projecting portion 36 forms a labyrinth together with the distal end of the slinger 40.

According to the embodiment described above, the rigidity of the slinger 40 is increased by flexing the slinger 40 through provision of the projecting portion 46 on the flat surface 44 of the slinger 40. Consequently, a change in accuracy of the slinger 40 after it has been press fitted in the bearing can be prevented, and hence, the occurrence of deflection or warpage of the slinger 40 can be suppressed. Thus, the separation of the axial lip 32 from the slinger 40 is suppressed. Then, a stable contacting state between the axial lip 32 and the slinger 40 can be maintained. Consequently, it is possible to suppress an intrusion of foreign matters such as water into the radially inner side of the bearing after overpassing the axial lip 32.

In addition, according to the embodiment, the radially inner side inner surface 34 of the axial lip 32 and the radially outer side sloping surface 47 of the projecting portion 46 of the slinger 40 form the labyrinth in the position lying further radially inwards than the position where the axial lip 32 is brought into contact with the flat surface 44 of the slinger 40. In addition, the side surface 30 of the seal 20 and the apex portion 48 of the projecting portion 46 on the slinger 40 form the labyrinth in the position lying further radially inwards than the position where the axial lip 32 is formed. Consequently, even in the event that water intrudes radially inwards of the bearing after overpassing the axial lip 32, it is possible to suppress an intrusion of foreign matters such as water into the vicinity of the inner ring of the bearing by the labyrinth formed on the radially inner side of the axial lip 32, thereby making it possible to increase the water resistance of the bearing.

According to the embodiment, the projecting portion 36 on the side surface 30 of the seal 20 and the flat surface 44 of the slinger 40 form the labyrinth in the position lying further radially outwards than the distal end of the axial lip 32. Consequently, it is possible to suppress an intrusion of foreign matters such as water into the space between the portion of the seal 20 which lies on the radially outer side of the axial lip 32 from the radially outer side distal end of the slinger 40, thereby making it possible to increase the water resistance of the bearing.

In the embodiment described above, while the distal end of the axial lip 32 and the flat surface 44 of the slinger 40 are configured as being brought into contact with each other, a configuration can also be adopted in which the distal end of the axial lip 32 and the flat surface 44 of the slinger 40 are put in a non-contact, closely lying state to each other. As this occurs, by increasing the rigidity of the slinger 40 through flexure of the slinger 40, it is possible to suppress a change in the width of the space of the labyrinth formed by the axial lip 32 and the slinger 40. Consequently, the labyrinth works effectively, whereby it is possible to suppress an intrusion of foreign matters such as water into the radially inner side of the bearing after overpassing the axial lip 32.

Embodiment 2

The configuration of Embodiment 2 of the invention will be described.

Figure 3:
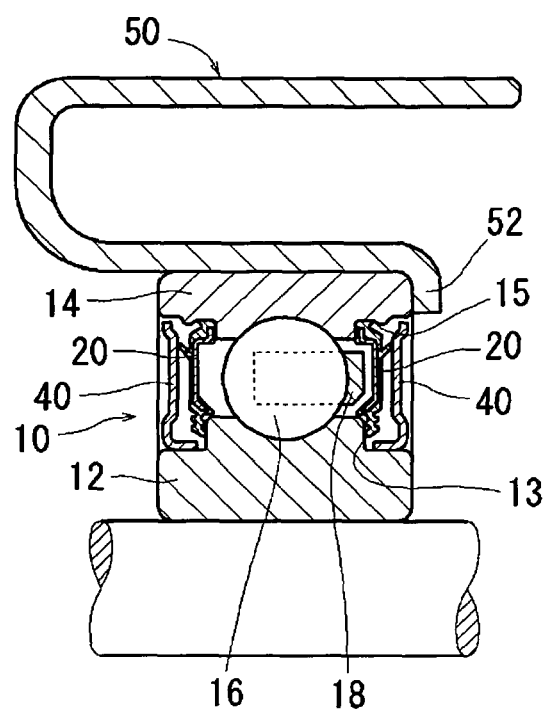
FIG. 3 A partial sectional view of an idler pulley used in a bearing including a rolling bearing sealing device according to Embodiment 2.
Figure 4:
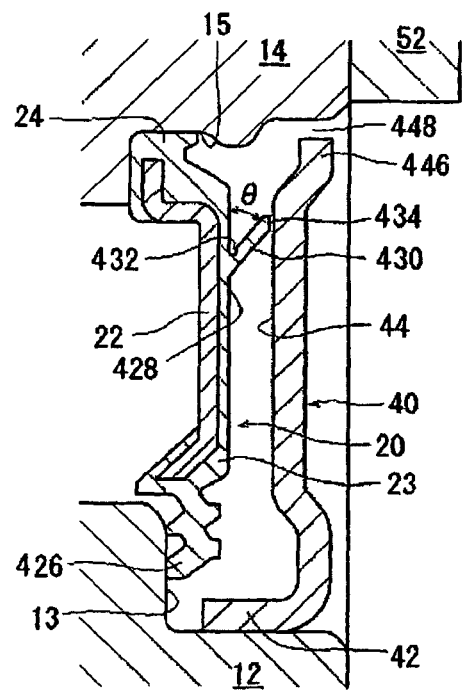
FIG. 4 An enlarged view of a portion related to the rolling bearing sealing device in FIG. 3.

In a sealing device according to this embodiment, like reference numerals will be given to like constituent portions to those of Embodiment 1 that has been described above, and the repetition of the same description will be omitted. FIG. 3 shows a partially sectional view of an idler pulley 50 which uses a rolling bearing 10 including a rolling bearing sealing device according to Embodiment 2 of the invention. FIG. 4 shows an enlarged view of the portion of the sealing device in the rolling bearing 10 shown in FIG. 3.

As is shown in FIGS. 3 and 4, the rolling bearing 10 is an outer ring rolling type single row ball bearing used in the idler pulley 50.

As is shown in FIG. 4, a conical side lip 30, which expands outwards of the bearing while being inclined radially outwards and outwards of the bearing, is formed on a side surface 28 of a seal 20 which lies further radially outwards than a seal lip 26 and which constitutes a side of the seal 20 which faces an outside of the bearing or an axially outer side of the seal 20 which faces a slinger 40 in a position which lies closer to a radially outer portion of the seal 20. A gutter-shaped groove 32 is formed on a radially outer side of a root portion of the side seal 30 to the side surface 28 of the seal 20. A distal end face 34, of which a surface is vertical to an axial direction, is formed at a distal end of the side lip 30. A flat portion 44, which is vertical to the axial direction, is formed on a side surface of the slinger 40 which faces the distal end face 34. In such a state that the bearing is rotating, a space between the distal end face 34 and the flat portion 44 becomes narrow, so that the distal end face 34 and the flat portion 44 form a labyrinth.

As is indicated by θ in FIG. 4, an inclination angle θ of the slide lip 30 which expands radially outwards and outwards of the bearing is preferably 45 degrees or smaller in order to ensure the width of the distal end face 34.

Figure 5A:
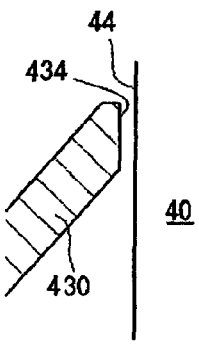
FIG. 5A is an enlarged view of Embodiment 2.
Figure 5B:
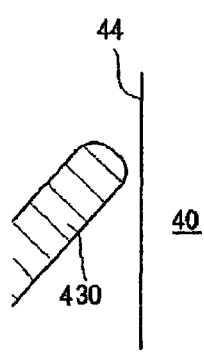
FIG. 5B is an enlarged view of a distal end portion of a slide slip of a modified example.

FIG. 5A shows an enlarged view of a distal end portion of the slide lip 30. FIG. 5B shows a modified example in which no distal end face 34 is formed at the distal end portion of the slide lip. Molding the side lip 30 of the modified example is easier than the side lip 30 shown in FIG. 5A. In Embodiment 2, by providing the distal end face 34 at the distal end of the side lip 30, a width over which the space between the side lip 30 and the slinger 40 is made narrow is extended.

In Embodiment 2, while a covering portion 23, a fixing portion 24, the seal lip 26 and the side lip 30 of the seal 20 are molded integrally, the side lip 30 may be molded separately so as to be bonded to the side surface 28 of the covering portion 23 of the seal 20. In the event that the side lip 30 is molded separately, molding the side lip 30 of a softer material than that of the covering portion 23 is facilitated. The material of the seal 20 including the side lip 30 is not limited to rubber, and hence, the seal 20 may be formed of a synthetic resin.

In Embodiment 2, as has been described before, the distal end face 34 of the side lip 30 and the flat portion 44 of the slinger 44 are configured so as to define the narrow space. However, in consideration of variation in production, an event is permitted in which the distal end face 34 of the side lip 30 is brought into contact with the flat portion 44 of the slinger 40 in such a state that the bearing is rotating. When the distal end face 34 and the flat portion 44 are brought into contact with each other, the side lip 30 collapses inwards of the bearing to be deformed, whereby the contact force exerted by the slinger 40 is absorbed by the side lip 30, and hence, almost no axial stress is transmitted to the covering portion 23 and a core metal 22 of the seal 20.

The slinger 40 is an annular metallic plate. As is shown in FIG. 4, an inner circumferential edge of the slinger 40 is bent inwards of the rolling bearing 10 into a cylindrical shape so as to form a cylindrical portion 42. The cylindrical portion 42 is press fitted on a radially outer side of an inner ring 12, whereby the slinger 40 is fixed to the inner ring 12. A distal end portion 46 at an outer circumferential end of the slinger 40 defines a space between a bore surface or a radially inner surface of an outer ring 14 and itself, whereby an opening portion 48 is formed which is open towards an exterior portion of the bearing. In addition, as has been described before, in such a state that the bearing is rotating, the flat portion 44 on an axially inner side of the slinger 40 is kept non-contact with the side lip 30 of the seal 20.

Next, the function of the rolling bearing sealing device according to Embodiment 2 will be described.

In the rolling bearing 10, the side lip 30 of the seal 20 and the flat portion 44 of the slinger 40 are kept non-contact with each other. The extremely narrow labyrinth is formed between the distal end face 34 of the side lip 30 and the flat portion 44 of the slinger 40, whereby it is possible to suppress an intrusion of foreign matters such as water and dust which enter between the seal 20 and the slinger 40 from a radially outer side of the slinger 40 into a radially inner side of the bearing. Here, since the radial width of the labyrinth is widened by the distal end face 34 of the side lip 30, the sealing performance against the intrusion of foreign matters is increased.

In addition, when the side lip 30 of the seal 20 and the slinger 40 are brought into contact with each other due to variation in production, since the space between the seal 20 and the slinger 40 is closed by the side lip 30, it is possible to suppress an intrusion of foreign matters such as water and dust which enter between the seal 20 and the slinger 40 into the radially inner side of the bearing.

Here, when the side lip 30 is brought into contact with the slinger 40, the side lip 30 collapses inwards of the bearing to be deformed. Thus, the contact force exerted by the slinger 40 is absorbed by the side lip 30. Consequently, even in the event that the slinger 40 is in contact with the side lip 30, almost no axial stress is transmitted to the portion of the seal 20 at the root of the side lip 30 which extends from the covering portion 23 to the core metal 22, and hence, there is no fear that the core metal 22 is deformed. Therefore, there is no concern that the portion of the seal lip 26 which is in sliding contact with the inner ring 12 is deformed as a result of deformation of the core metal 22 whereby the contacting state between the seal lip 26 and the inner ring 12 is changed. Consequently, in the rolling bearing 10, the deformation of the core metal 22 of the seal 20 can be avoided so as to suppress an intrusion of foreign matters such as water and dust which enter between the seal 20 and the slinger 40 into the interior of the bearing.

The groove 32 at the root portion of the side lip 30 to the seal 20 functions to reduce the rigidity of the root portion of the side lip 30 so that the side lip 30 is made easy to be separated from the slinger 40.

In addition, since the side lip 30 expands towards the distal end face 34, in the event that foreign matters such as water and dust intrude into a radially inner side of the side lip 30 after overpassing the labyrinth formed by the distal end face 34 and the flat portion 44 of the slinger 40, foreign matters sticking to the radially inner side of the side lip 30 are easy to be discharged radially outwards from the space of the labyrinth by virtue of a centrifugal force generated by the rotation of the side lip 30.

Additionally, when the rolling bearing 10 is stationary, since the side lip 30 of the seal 20 which is left in an upper position when the bearing has stopped rotating collapses by gravity to thereby be brought into contact with the flat portion 44 of the slinger 40, the space between the seal 20 and the slinger 40 is closed by the side lip 30 above the rolling bearing 10. When this occurs, the groove 32 in the root portion of the side lip 30 to the seal 20 functions to decrease the rigidity of the side lip 30 at the root to thereby facilitate the collapse of the side lip 30 by gravity.

Consequently, when lots of water is poured on to the rolling bearing 10 which is stationary whereby water enters between the seal 20 and the slinger 40, the groove 32 at the root portion of the side lip 32 functions as a gutter, and water having entered into the upper portion of the bearing flows down along the radially outer side of the side slip 30 to thereby be collected into the groove 32 and flows further downwards of the bearing along the groove 32. Thus, an intrusion of water into the radially inner side of the bearing from the space between the seal 20 and the slinger 40 is suppressed.

Embodiment 3

Next, Embodiment 3 of the invention will be described.

Figure 6:
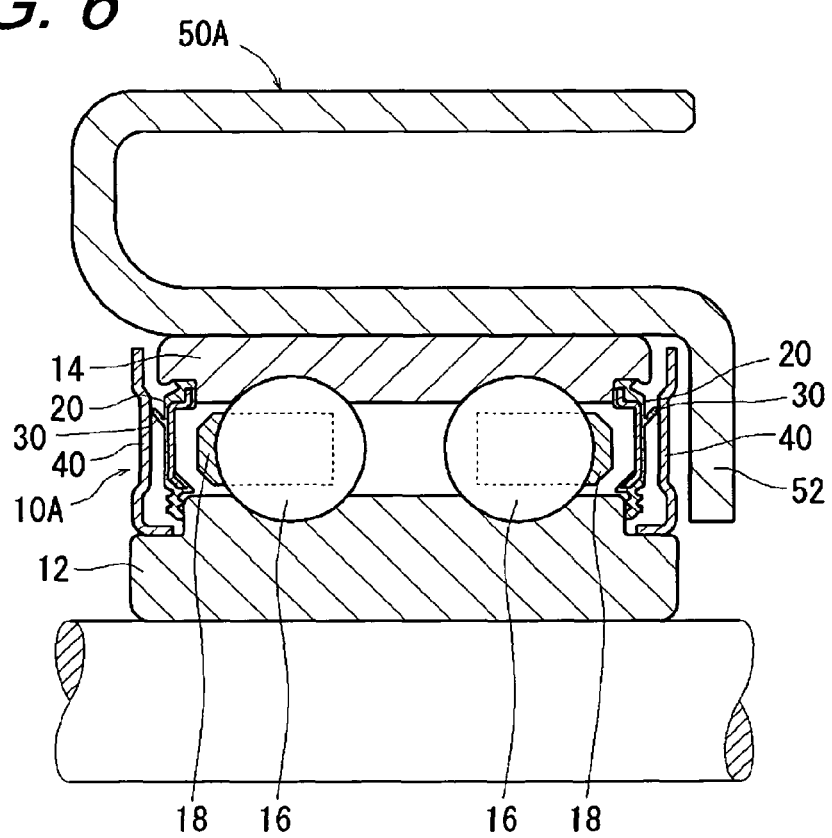
FIG. 6 A partial sectional view of an idler pulley used in a bearing including a rolling bearing sealing device according to Embodiment 3.

FIG. 6 shows a partially sectional view of an idler pulley 50A which uses a rolling bearing 10A including a rolling bearing sealing device according to Embodiment 3 of the invention. As is shown in FIG. 6, the rolling bearing 10A is an outer ring rotating type double row ball bearing which is used in the idler pulley 50A and includes an inner ring 12, an outer ring 14, a cage 18 for retaining double rows of balls 16, 16, a seal 20 for covering a space between the inner ring 12 and the outer ring 14 and a slinger 40 which is provided on a side of the seal 20 which faces an outside of the bearing or an axially outer side of the seal 20.

Embodiment 3 is characterized in that the sealing performance of the rolling bearing 10A is increased by making use of part of a construction of the idler pulley 50A for incorporating the rolling bearing 10A therein. Namely, as is shown in FIG. 6, a rib 52 of the idler pulley 50A extends as far as the vicinity of a radially outer surface of the inner ring 12 on a side of the slinger 40 which faces an outside of the bearing or an axially outer side of the slinger 40, so that a labyrinth is formed by an axially outer side surface of the slinger 40 and a side of the rib 52 which faces an inside of the bearing or an axially inner side of the rib 52.

A width of the outer ring 14 is narrower than a width of the inner ring 12, and a distal end portion 46 of the slinger 40 extends as far as the vicinity of a radially outer side of the outer ring on a side of the outer ring 14 which faces the outside of the bearing or an axially outer side of the outer ring 14, so that a labyrinth is formed by an outer surface of the outer ring 14 and an inner surface of the slinger 40. The seal 20 has the same configuration as that of the seal 20 of Embodiment 2. The seal 20 is fixed to the outer ring 14 by a fixing portion 24, and a seal lip 26 is brought into sliding contact with a sliding contact surface 13 of the inner ring 12. A side slip 30 is kept non-contact with a flat portion 44 of the slinger 40.

In Embodiment 3, since a sealing function by the side lip 30 and the slinger 40 and an advantage obtained thereby are the same as those of Embodiment 2, a detailed description thereof will be omitted here. In Embodiment 3, in addition to the advantage described in Embodiment 2, a sealing effect by the labyrinth formed by the slinger 40 and the rib 52 of the idler pulley 50A is added. Thus, the general sealing performance of the bearing is increased.

In the case of the pulley being a pressed pulley which is formed through deep draw forming, since a punching step employing a punch is included, the same forming cost is involved whether an opening diameter of the rib is made small by leaving the rib slightly longer or the opening diameter of the rib is made large by shortening the rib. Consequently, with the pressed pulley, lengthening the rib increases merit in terms of forming cost.

In the respective embodiments, while the side lip 30 is formed closer to the radially outer side of the side surface 28 of the seal 20, the side lip 30 may be formed centrally in the radial direction. In addition, the shape of the side lip 30 is not limited to the conical shape.

Additionally, in the respective embodiments, while the slinger 40 is press fitted on the inner ring 12 so as to be fixed to the inner ring 12, an end of the slinger 40 which faces the inner ring 12 may be fixed directly to the shaft on a side surface of the inner ring 12.

In the respective embodiments, while the rolling bearing sealing device is described as being used in the outer ring rotating type double row ball bearing and single row ball bearing which are used in the idler pulley, the application of the rolling bearing sealing device according to the invention is not limited to rolling bearings for idler pulleys. The rolling bearing sealing device according to the invention is such as to be applied to outer ring rotating type rolling bearings in general.

In addition, the rolling bearing sealing device according to the invention is such as to be realized in various forms without departing from the concept of the invention.

Embodiment 4

The configuration of Embodiment 4 of the invention will be described.

Figure 7:
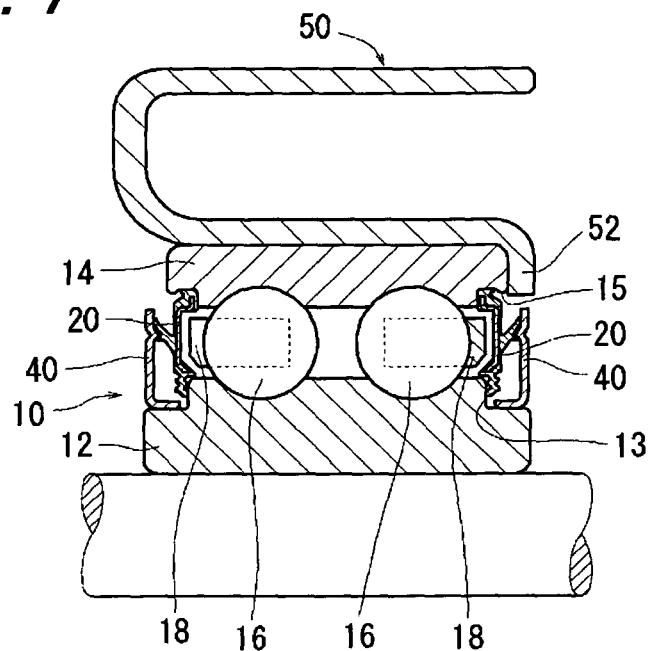
FIG. 7 A partial sectional view of an idler pulley used in a bearing including a rolling bearing sealing device according to Embodiment 4.
Figure 8:
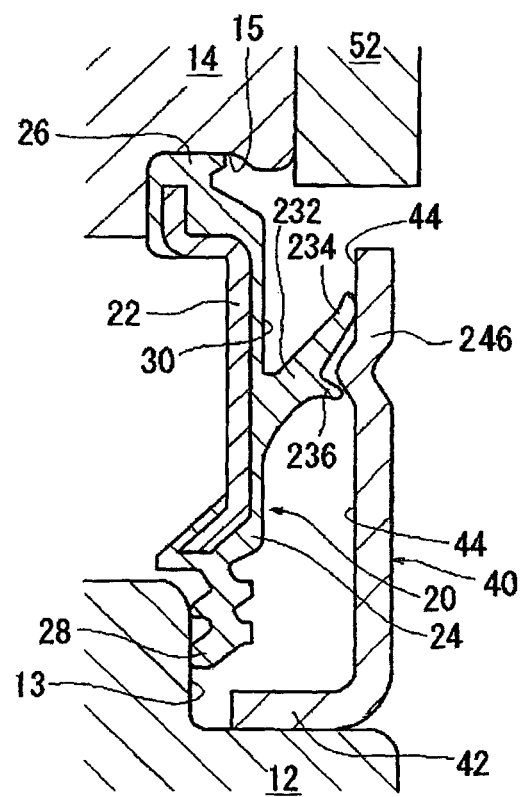
FIG. 8 An enlarged view of a portion related to the rolling bearing sealing device in FIG. 7.

In a sealing device according to this embodiment, like reference numerals will be given to like constituent portions to those described in Embodiment 1, and the repetition of the same description will be omitted here. FIG. 7 shows a partially sectional view of an idler pulley 50 which uses a rolling bearing 10 including a rolling bearing sealing device according to Embodiment 4 of the invention. FIG. 8 shows an enlarged view of the sealing device of the rolling bearing 10 shown in FIG. 7.

As is shown in FIG. 8, an axially outer side surface of a seal 20 which lies between a fixing portion 26 and a seal lip 28 is formed into a flat side surface 30. A conical axial lip 232 is formed at a substantially radially central portion on the side surface 30 so as to extend outwards of the bearing. The thickness of the axial lip 232 is made thickest at a root portion of the side surface 30 to the seal 20 and decreases towards a distal end thereof. A distal end portion of the axial lip 232 is made into a first sliding contact portion 234.

There is formed a reversely conical second sliding contact portion 236 which branches off at an intermediate portion of the axial lip 232 which expands outwards of the bearing so as to contract outwards of the bearing.

A slinger 40 is an annular metallic plate. As is shown in FIG. 8, a cylindrical portion 42 is formed on an inner circumferential side of the slinger 40 by bending an inner circumferential end thereof inwards of the rolling bearing 10 into a cylindrical shape. The cylindrical portion 42 is press fitted on a radially outer side of an inner ring 12, so that the slinger 40 is fixed to the inner ring 12. A portion on the slinger 40 which faces the side surface 30 of the seal 20 is formed into a flat portion 44 which is almost parallel to the side surface 30. An end of the slinger 40 which lies at a radially outer side thereof defines a space together with the seal 20, a bore surface or a radially inner surface of an outer ring 14 and a rib 52 of the idler pulley 50, and the space is open to an exterior portion of the bearing.

An annular projecting portion 246, which is made to project on a side facing an outside of the bearing or an axially outer side, is formed along the full circumference of the slinger 40 at the flat portion 44 thereof. The slinger 40 is formed through pressing.

The first sliding contact portion 234, which is the distal end portion of the axial lip 232, is brought into contact with the flat portion 44 of the slinger 40 with an interference in such a state that the bearing has stopped rotating. The second sliding contact portion 236, which branches off at the intermediate portion of the axial lip 232, is positioned fluffier radially inwards than the projecting portion 246 of the slinger 40 and is kept non-contact with the projecting portion 246 of the slinger 40 in such a state that the bearing has stopped rotating.

Next, a function and advantage of Embodiment 4 will be described.

In the rolling bearing 10, in such a state that the bearing has stopped rotating, the first sliding contact portion 234 is in contact with the flat portion 44 of the slinger 40 with the interference. Consequently, it is possible to suppress an intrusion of foreign matters such as water and dust which enter between the seal 20 and the slinger 40 from the end of the slinger 40 at the radially outer side thereof into a radially inner side of the bearing. Since the first sliding contact portion 234 is in contact with the flat portion 44 of the slinger 40 with the interference, when the bearing is rotating at low speeds, even in the event that axial lip 232 is pulled radially outwards to be slightly deformed by a centrifugal force generated, the contacting state between the first sliding contact portion 234 and the slinger 40 is maintained.

In such a state that the bearing has stopped rotating, the second sliding contact portion 236 is kept non-contact with the slinger 40, and the non-contact state between the second sliding contact portion 236 of the axial lip 232 and the slinger 40 is maintained even when the bearing is rotating at low speeds. Consequently, there is caused no such situation that torque is increased by provision of the second sliding contact portion 236.

When the rotating speed of the rolling bearing 10 is increased to a high speed, the second sliding contact portion 236 which branches off at the intermediate portion of the axial lip 232 is also pulled radially outwards to be deformed in association with the radially outward deformation of the axial lip 232, whereby the second sliding contact portion 236 is brought into contact with a radially inward side surface of the projecting portion 246 of the slinger 40.

Figure 9:
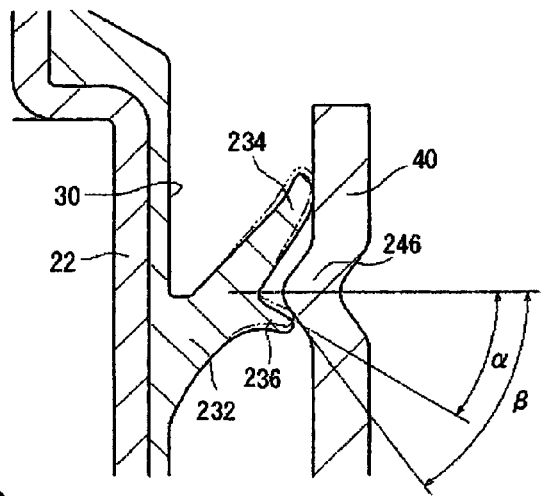
FIG. 9 A drawing showing a modification to an axial lip in Embodiment 4.

FIG. 9 shows by use of imaginary lines a state in which the second sliding contact portion 236 is brought into contact with the projecting portion 246 of the slinger 40 as a result of the deformation of the axial lip 232 by the centrifugal lip. Here, an inclination angle of the radially inward side surface of the projecting portion 246 of the slinger 40 based on horizontality is set larger than an inclination angle of a radially outward side surface of the second sliding contact portion 236 of the axial lip 32. Because of this, the distal end portion of the second sliding contact portion 236 is brought into contact with the radially inward side surface of the projecting portion 246 by the deformation of the axial lip 232. There is caused no such situation that the side surface of the second sliding contact portion 236 is brought into contact with an apex portion of the projecting portion 246. Consequently, contact torque can be suppressed to a low lever, thereby making it possible to suppress the wear of the second sliding contact portion 236 to a low level.

When the rotating speed of the rolling bearing 10 is increased further to a higher speed, the axial lip 232 and the first sliding contact portion 234 are deformed largely, whereby the first sliding contact portion 234 is put in a non-contact state relative to the flat portion 44 of the slinger 40. As this occurs, the contacting state between the second sliding contact portion 236 and the projecting portion 246 of the slinger 40 is maintained.

In this way, when the rolling bearing 10 is rotating at high speeds, since the second sliding contact portion 236 of the axial lip 232 is brought into contact with the slinger 40, it is possible to suppress an intrusion of foreign matters such as water and dust which enter between the seal 20 and the slinger 40 from the opening portion at the end of the slinger 40 at the radially outer side thereof into the radially inner side of the bearing.

Since the axial lip 232 changes its contact portion with the slinger 40 in accordance with the rotating speed of the rolling bearing 10, a change in torque in association with a change in rotating speed of the bearing is small.

When the rotating speed of the rolling bearing 10 is decreased from the state in which the rolling bearing 10 is rotating at high speeds, firstly, the first sliding contact portion 234 of the axial lip 232 is brought into contact with the slinger 40. Following this, the second sliding contact portion 236 is put in the non-contact state with the projecting portion 246 of the slinger 40.

Embodiment 5

Next, the configuration of Embodiment 5 of the invention will be described.

Figure 10:
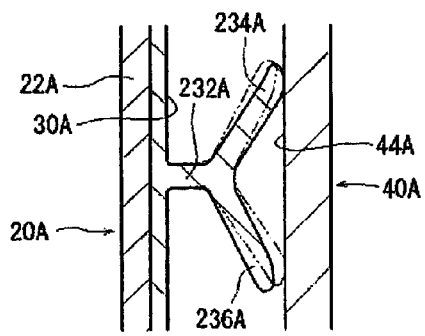
FIG. 10 A partial enlarged view of sections of a seal and a slinger in Embodiment 5.

FIG. 10 shows a partially enlarged view of sections of a seal 20A and a slinger 40A which make up a rolling bearing sealing device according to Embodiment 5 of the invention.

Embodiment 5 is mainly characterized in that the construction of an axial lip 232A differs from Embodiment 4 and that no projecting portion is provided on the slinger 40A. The axial lip 232A is formed to extend outwards of a bearing from a radially central portion of a side surface 30A of a seal 20A almost parallel to an axis and branches into a first sliding contact portion 234A which has a conical shape and expands outwards of the bearing and a second sliding contact portion 236A which has a reversely conical shape and contracts outwards of the bearing.

The first sliding contact portion 234A is brought into contact with a flat portion 44A of the slinger 40A with an interference in such a state that the bearing has stopped rotating. The second sliding contact portion 236A is put in a non-contact state with the flat portion 44A of the slinger 40A with a slight space defined therebetween.

In Embodiment 5, when the rolling bearing rotates at high speeds, the axial lip 232A is deformed outwards of the bearing by a centrifugal force generated, and firstly, the second sliding contact portion 236A is brought into contact with the flat portion 44A of the slinger 40A. When the rolling bearing rotates at higher speeds, the first sliding contact portion 234A is spaced apart from the flat portion 44A of the slinger 40A and is then put in a non-contact state with the slinger 40A. The state in which the axial lip 232A is deformed by the centrifugal force is indicated by the imaginary lines in FIG. 10.

Consequently, with the configuration of Embodiment 5, too, the contacting state between the axial lip 232A and the slinger 40A can be maintained even in such a state that the bearing is rotating at high speeds.

Embodiment 6

The configuration of Embodiment 6 of the invention will be described.

Figure 11:
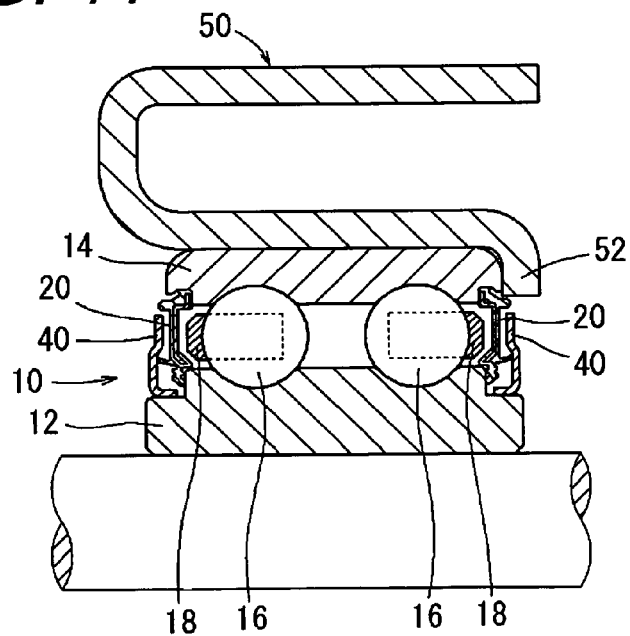
FIG. 11 A partial sectional view of an idler pulley used in a bearing including a rolling bearing sealing device according to Embodiment 6.
Figure 12:
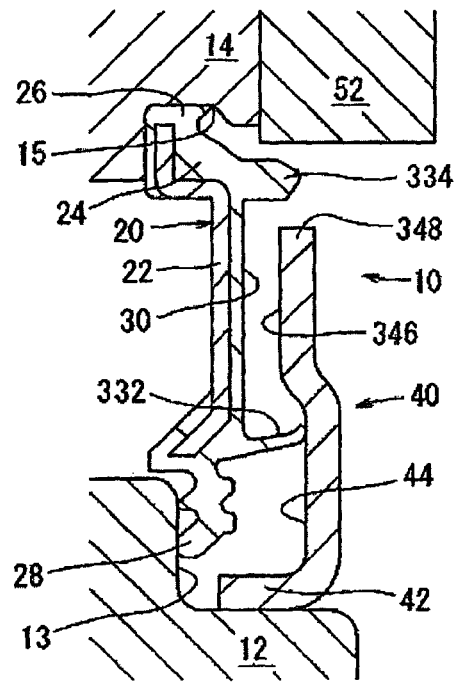
FIG. 12 An enlarged view of a portion related to the rolling bearing sealing device in FIG. 11.

In a sealing device according to this embodiment, like reference numerals will be given to like constituent portions to those described in Embodiment 1 described before, and the repetition of the same description will be omitted here. FIG. 11 shows a partially sectional view of an idler 50 which uses a rolling bearing 10 including a rolling bearing sealing device according to Embodiment 6 of the invention. FIG. 12 shows an enlarged view of the portion of the sealing device of the rolling bearing 10 shown in FIG. 11.

As is shown in FIG. 12, a portion of an axially outer side of a seal 20 which lies between a fixing portion 26 and a seal lip 28 is formed into a flat side surface 30. An axial lip 332 is formed at an end of the side surface 30 on a radially inner side thereof and adjacent radially outwards to the position where the seal lip 28 is formed so as to extend axially outwards of the bearing. A projecting portion 334 is formed at an end of the side surface 30 of the seal 20 on a radially outer side thereof so as to project axially outwards of the bearing.

A portion of the slinger 40 which faces the seal 20 is formed into a flat surface 44 which is almost vertical to an axial direction. A bent projecting portion 346, which is caused to project inwards of the bearing relative to the flat surface 44, is formed in a position where the flat surface 44 of the slinger 40 faces a radially inward portion of the side surface 30 of the seal 20 by bending the flat surface 44 in the axial direction. The bent projecting portion 346 extends to reach a radially outer side end portion 348 of the slinger 40. The bent projecting portion 346 of the slinger 40 and the side surface 30 of the seal 20 is put in a non-contact, closely lying state to each other, so as to form a labyrinth.

The radially outer side end portion 348 of the slinger 40 defines a space together with the seal 20, a radially inner surface of the outer ring 14 and a rib 52 of the idler pulley 50, and the space is open to an exterior portion of the bearing.

A distal end of the axial lip 332 which is formed at the radially inner side end of the side surface 30 of the seal 20 is brought into contact with the flat surface 44 of the slinger 40 in a position lying further radially inwards than the position on the slinger 40 where the bent projecting portion 346 is formed.

A radially inward side surface of a projecting portion 334 which is formed at a radially outer side end of the side surface 30 of the seal 20 is put in a non-contact, closely lying state to a radially outer side end face f the radially outer side end portion 348 of the slinger, so as to form a labyrinth.

According to Embodiment 6, since the flat surface 44 of the slinger 40 with which the distal end of the axial lip 332 is brought into contact lies in a position on a radially inner side of the bearing which is situated further radially inwards of the bearing than the bent projecting portion 346 of the slinger 40, the diameter of a distal end of the axial lip 332 which is brought into contact with the flat surface 44 of the slinger 40 is small. Consequently, a contact circular diameter between the distal end of the axial lip 332 and the flat surface 44 of the slinger 40 becomes small. As a result, since the circumferential velocity by relative rotation between the axial lip 332 and the slinger 40 becomes small, torque is reduced, thereby making it possible to reduce the wear of the axial lip 332. Thus, heat generated by the axial lip 332 sliding on the slinger being is reduced, and the heat resistance of the seal 20 is mitigated. This enables a material having heat resistance which is not high to be used for the seal 20.

Since the axial lip 332 is in contact with the flat surface 44 of the slinger 40 so as to close a space between the seal 20 and the slinger 40, it is possible to suppress an intrusion of foreign matters such as water and dust which enter into the space between the seal 20 and the slinger 40 from an opening portion in the bearing which lies at the radially outer side end portion 348 of the slinger 40 into the periphery of the seal lip 28 which is situated further radially inwards of the bearing than the position where the axial lip 332 is formed.

Since the axial lip 332 is in contact with the flat surface 44 of the slinger 40 in the position lying further radially inwards than the position where the bent projecting portion 346 of the slinger 40 is formed, it is possible to suppress an intrusion of foreign matters such as water and dust which enter into the space between the seal 20 and the slinger 40 from the opening portion in the bearing which lies at the radially outer side end portion 348 of the slinger 40 into the portion where the axial lip 332 is brought into contact with the flat surface 44 of the slinger 40. The rigidity of the slinger 40 can be increased with the slinger 40 mounted in the bearing by forming the bent projecting portion 346 on the slinger 40.

An intrusion of foreign matters such as water in to the space between the seal 20 and the slinger 40 from the radially outer side end portion 348 of the slinger 40 is suppressed by the labyrinth formed by the projecting portion 334 which is formed at the radially outer side end of the side surface 30 of the seal 20 and the radially outer side end portion 348 of the slinger 40.

Consequently, according to Embodiment 6, there can be provided the rolling bearing sealing device which can reduce the wear of the seal 20 by lowering the sliding torque of the axial lip 332 and which can realize an increase in water resistance.

Embodiment 7

Figure 13:
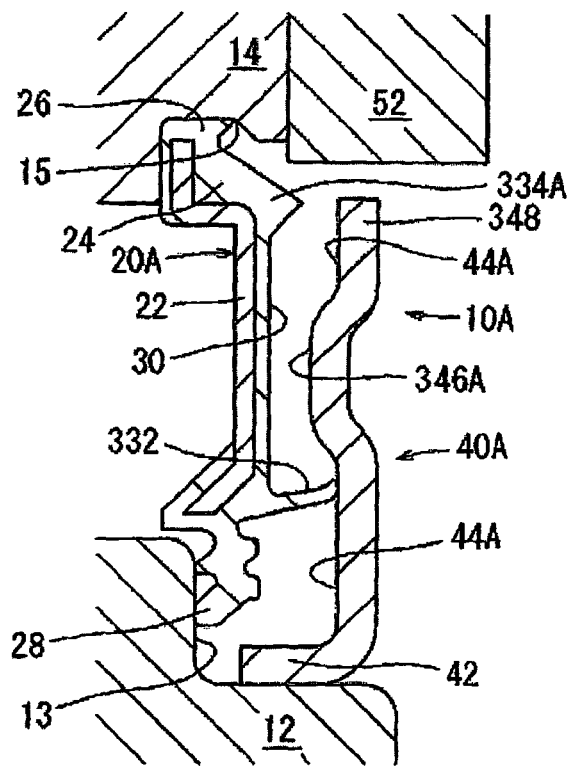
FIG. 13 An enlarged view of a portion related to a rolling bearing sealing device according to Embodiment 7.
Figure 14:
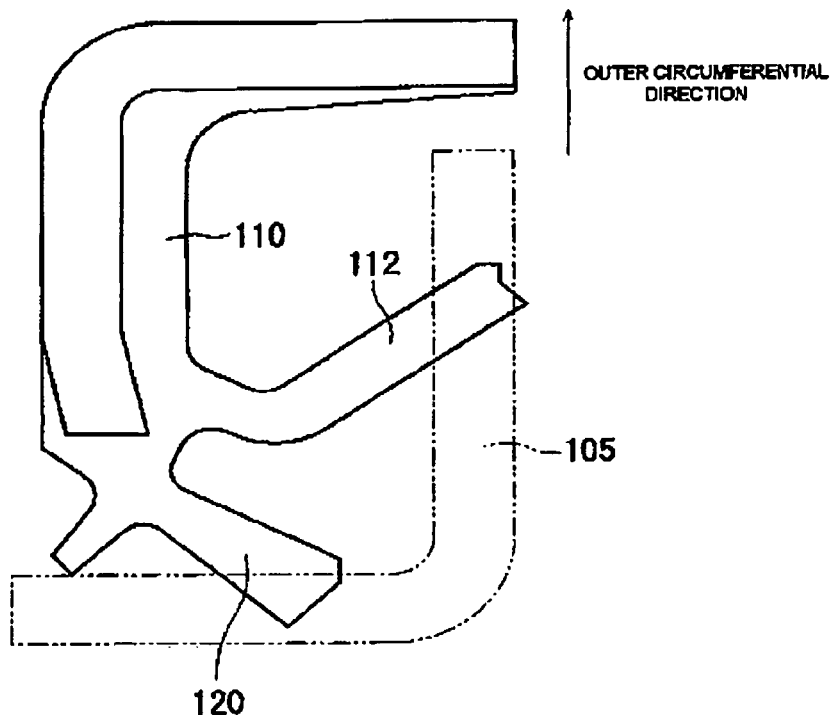
FIG. 14 A drawing showing a related art.

FIG. 13 shows an enlarged view of a portion of an idler pulley which uses a rolling bearing 10A including a rolling bearing sealing device according to Embodiment 7 of the invention where the sealing device of the rolling bearing 10A is provided. Embodiment 7 is common to Embodiment 6 excluding part of the configurations of a seal A and a slinger 40A. Thus, like reference numerals will be given to common portions so as to omit the repetition of the same description.

Hereinafter, the configuration of Embodiment 7 will be described based on different portions. In the slinger 40A, a bent projecting portion 346A does not reach a radially outer end of the slinger 40A, and the bent projecting portion 346A is formed at a radially intermediate portion of a flat surface 44A by bending the flat surface at two radial locations. The bent projecting portion 346A of the slinger 40A and a side surface 30 of a seal 20A are put in a non-contact, closely lying state to each other, so as to form a labyrinth.

A projecting portion 334A is formed at a radially outer side end of the side surface 30 of the seal 20A so as to extend axially outwards of the bearing. An axially outward distal end of the projecting portion 334A is put in a non-contact, closely lying state to the flat surface 44A on an axially inner side of the radially outer side end portion 348 of the slinger 40A, so as to form a labyrinth.

An axial lip 332 is formed adjacent radially outwards to a seal lip 28, and a distal end of the axial lip 332 is brought into contact with the flat surface 44A at a portion lying further radially inwards than the bent projecting portion 346A of the slinger 40A.

According to Embodiment 7, an intrusion of foreign matters such as water and dust into a space between the seal 20A and the slinger 40A from an opening portion in the bearing at the radially outer side end portion 348 of the slinger 40A is suppressed by the labyrinth formed by the projecting portion 334A of the seal 20A and the flat surface 44A of the slinger 40A. In addition, it is possible to suppress an intrusion of foreign matters such as water and dust which enter between the seal 20A and the slinger 40A from the opening portion in the bearing at the radially outer side end portion 348 of the slinger 40A into the portion where the axial lip 332 is in contact with the flat surface 44A of the slinger 40A by the labyrinth formed by the side surface 30 of the seal 20A and the bent projecting portion 346A of the slinger 40A.

Since the axial lip 332 is formed on the radially inner side of the seal 20A, the diameter of the axial lip 332 is small. Consequently, the contact circular diameter between the axial lip 332 and the flat surface 44A of the slinger 40A becomes small, and the circumferential velocity by relative rotation with the slinger 40A becomes small. Thus, torque is reduced, thereby making it possible to reduce the wear of the axial lip 332. Since heat generated by the axial lip 332 sliding on the slinger 40A is reduced whereby the heat resistance of the seal 20A is mitigated, it becomes possible to use a material having heat resistance which is not high for the seal 20A.

Since the slinger 40A is bent more largely than the slinger 40, the rigidity of the slinger 40A is increased further. The advantage provided by the projecting portion 334A is the same as Embodiment 6, and hence, the description thereof will be omitted here.

Consequently, with Embodiment 7, too, there can be provided the rolling bearing sealing device which can reduce the sliding torque of the axial lip 332 to thereby reduce the wear of the seal 20A and which can realize an increase in water resistance thereof.

In the embodiment, while the outer ring rotating type double row ball bearing and single row ball bearing are described as the examples to which the invention is applied, the application of the rolling bearing sealing device according to the invention is not limited to either of the double row ball bearing and the single row ball bearing. The rolling bearing sealing device according to the invention can be applied to rolling bearings in general whether they are double row rolling bearings, single row rolling bearings, outer ring rotating type rolling bearings or inner ring rotating type rolling bearings.

For example, in the respective embodiments, while the outer ring rotating type rolling bearing is described as the example to which the rolling bearing sealing device according to the invention is applied, the invention can also be applied to a sealing device for an inner ring rotating type rolling bearing. In the case of the sealing device for the inner ring rotating type rolling bearing, too, the contact circular diameter between an axial lip and a slinger is made small by the sealing effect by labyrinths and provision of the axial lip on a radially inner side of a seal, so as to reduce the circumferential velocity by relative rotation between the axial lip and the slinger, whereby the effect of reducing torque is exhibited.

In the respective embodiments, while the slide lip is formed to extend at the radially central portion on the side surface of the seal, the side lip may be formed closer to the radially outer side. In addition, in the respective embodiments, while the slinger is press fitted on the inner ring so as to be fixed to the inner ring, a configuration may also be adopted in which a radially inner side end of the slinger may be fixed directly to the shaft on a side surface of the inner ring.

In addition, the rolling bearing sealing device according to the invention can be realized in various forms without departing from the concept of the invention.

The invention claimed is:

1. A rolling bearing sealing device comprising:
   a seal fixed to an outer ring; and
   a slinger disposed concentrically with an inner ring on a side of the seal which faces an outside of the bearing or an axially outer side of the seal, a space defined by the seal and the slinger being open to an exterior portion of the bearing,
   wherein an axial lip which expands radially outwards of the bearing is formed on a side surface of the seal which faces the slinger,
   wherein a surface of the slinger which faces the seal is made into a flat surface and a projecting portion is formed on the flat surface of the slinger which is caused to project inwards of the bearing relative to the flat surface by flexing the slinger in an axial direction,
   wherein a distal end of the axial lip is put in a contacting state with or a non-contact, closely lying state to the flat surface of the slinger at a portion lying further radially outwards than the projecting portion on the slinger,
   wherein a radially inwards inner surface of the axial lip and a radially outer side sloping surface which is formed radially outwards of the projecting portion on the slinger are put in a non-contact, closely lying state to each other so as to form a labyrinth,
   wherein a portion of the side surface of the seal which lies further radially inwards than the position where the axial lip is formed and an apex portion of the projecting portion on the slinger are put in a non-contact closely lying state to each other so as to form a labyrinth,
   wherein a projecting portion projecting axially outwards of the bearing is formed on the side surface of the seal at a portion which lies further radially outwards than the distal end of the axial lip, and a distal end of the projecting portion is disposed further axially inward than the flat surface of the slinger.

2. A rolling bearing sealing device as set forth in claim 1, wherein the projecting portion and the slinger are put in a non-contact, closely lying state to each other so as to form a labyrinth.

3. A rolling bearing sealing device as set forth in claim 1, wherein a radially innermost portion of the seal and the slinger are in a non-contact state.

4. A rolling bearing sealing device as set forth in claim 1, wherein a gap is formed, in a radial direction, between a radially uppermost portion of the projecting portion and a radially lowermost portion of the projecting portion.

5. A rolling bearing sealing device as set forth in claim 1, wherein the slinger includes an annular portion comprising the surface of the slinger which faces the seal and a cylindrical portion disposed concentrically with an inner ring, and
   wherein the seal and the cylindrical portion of the slinger are in a non-contact state.

6. A rolling bearing sealing device as set forth in claim 1, wherein an axially inward side of the seal contacts the inner ring.

* * * * *